M. WAKULENKO.
BICYCLE.
APPLICATION FILED JAN. 2, 1918.
1,283,377.
Patented Oct. 29, 1918.
2 SHEETS—SHEET 2.
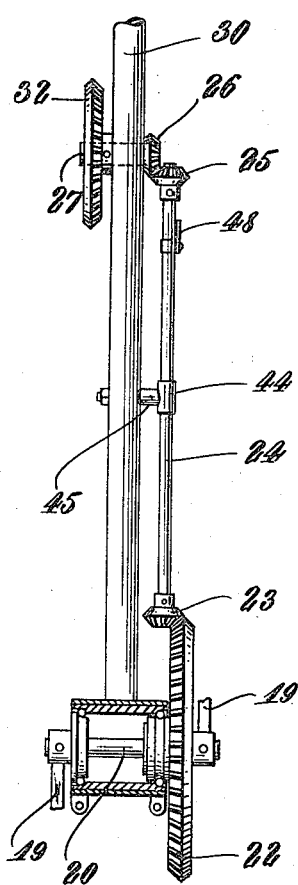
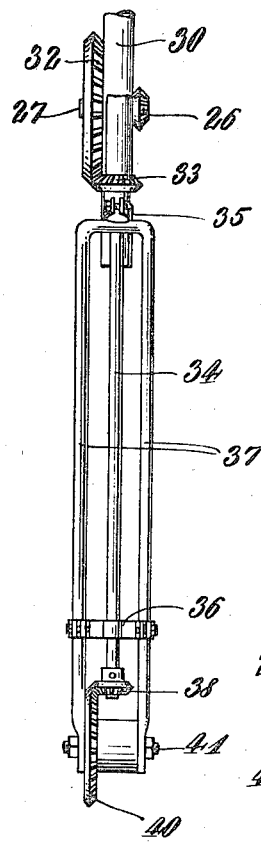
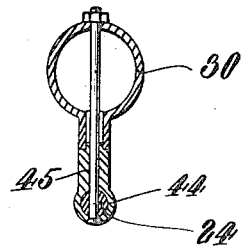
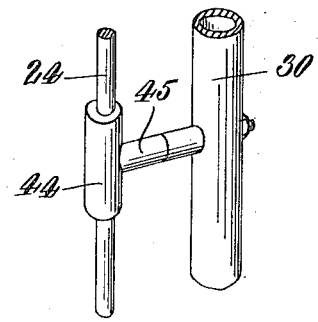
INVENTOR
MICHEAL WAKULENKO
BY
ATTORNEY

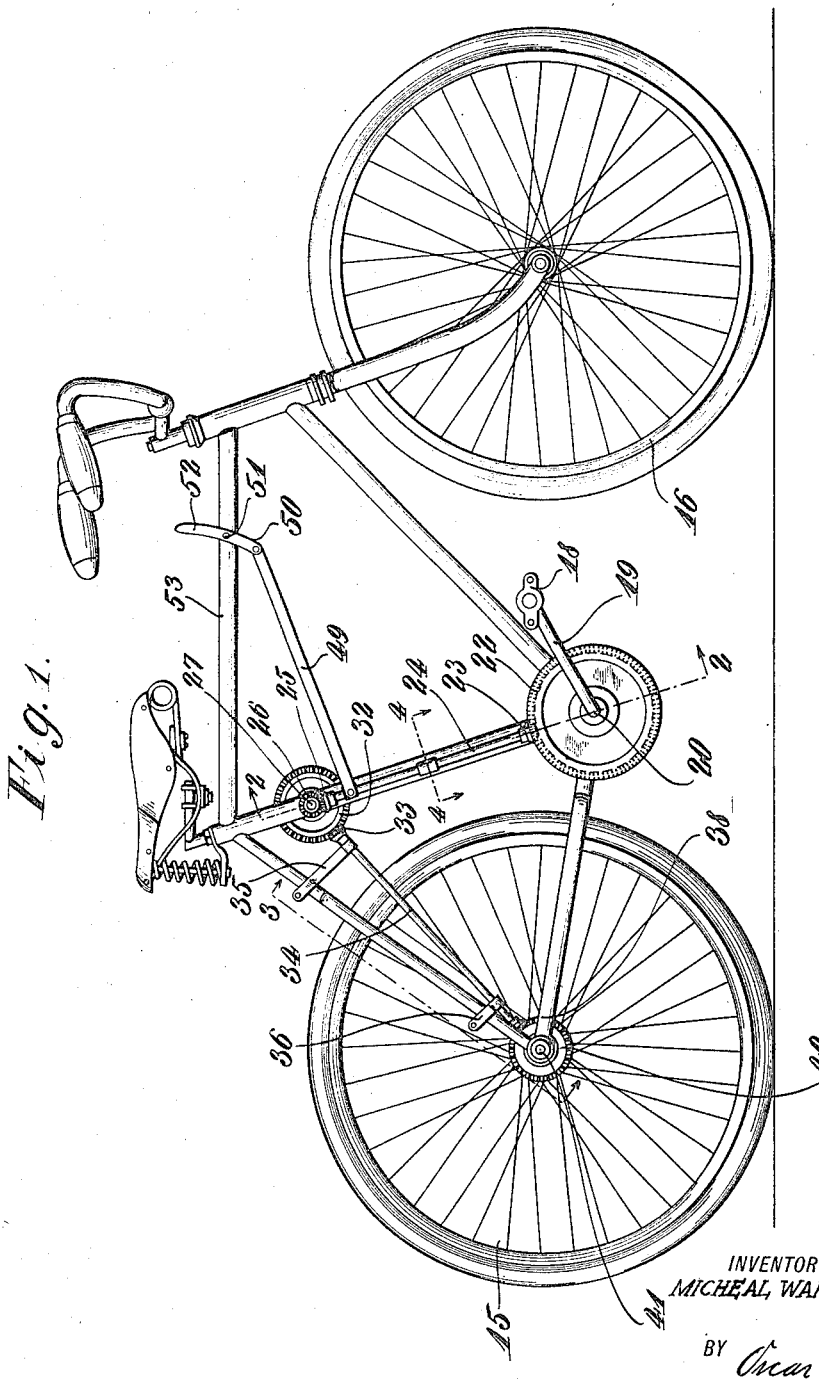

UNITED STATES PATENT OFFICE.

MICHEAL WAKULENKO, OF THE PAS, MANITOBA, CANADA.

BICYCLE.

1,283,377. Specification of Letters Patent. Patented Oct. 29, 1918.

Application filed January 2, 1918. Serial No. 209,994.

*To all whom it may concern:*

Be it known that I, MICHEAL WAKULENKO, a citizen of Russia, resident of The Pas, Province of Manitoba, and Dominion of Canada, have invented certain new and useful Improvements in Bicycles, of which the following is a specification.

This invention relates to improvements in bicycle drives and has as its special object the provision of means whereby power may be transmitted from a pedal driven shaft to the driving wheel of the bicycle in a positive manner and without the use of chains or belts.

A further object is to provide such driving means with a device which may be readily disconnected, at any desired time as in coasting, or traversing a downward grade.

These and other like objects are attained by the novel construction and combination of parts hereafter described and shown in the accompanying drawings, forming a material part of this disclosure, and in which—

Figure 1 is a side elevational view showing a bicycle and indicating the application of the invention.

Fig. 2 is an enlarged sectional view taken on line 2—2 of Fig. 1.

Fig. 3 is a similar enlarged view taken on line 3—3 of Fig. 1.

Fig. 4 is a transverse sectional view taken on line 4—4 of Fig. 1 and

Fig. 5 is a perspective view showing certain operative parts in detail.

In the drawings is shown a conventional type of bicycle having the usual diamond shaped frame supported by a rear driving wheel 15, and front or steering wheel 16, operated by handle bars in the usual manner.

Pedals 18, are attached to the cranks 19, on the shaft 20, which is housed in the lower part of the diamond frame and has rigidly attached to it a driving bevel gear 22, meshing with a pinion 23, secured to the lower end of an obliquely disposed shaft 24, having at its upper end a similar bevel pinion 25, engaged with a gear 26, mounted on a shaft 27 passing transversely through the post 30, and having secured upon the opposite side of the post a bevel gear 32, transmitting rotary motion to the pinion 33, on the shaft 34, journaled in bearings 35 and 36, attached to one of the upper rear elements 37 of the diamond frame.

The shaft 34 has at its lower end a pinion 38, engaging with the driving gear 40 secured to the rear axle 41, journaled in the end of the frame and having upon it the driving wheel 15.

From the foregoing it will be obvious that when the pedals are actuated, rotary motion will be transmitted directly to the rear wheel 15 and at such rate of speed as is indicated by the gearing.

The shaft 24 is rotatably mounted in the bearing 44, having a stem 45, engaged within the post 30 and connected to the shaft is a yoke 48, engaged with the link 49 pivotally connected to the lower end 50, of an operating lever 52, fulcrumed on the horizontal element 53 of the frame by the pin 51, but when the lever is actuated the shaft 24 causes the gears 23 and 25 to be moved into or out of engagement with those with which they normally mesh, thereby connecting or disconnecting the pedal movement from the train of gears.

Having thus described my invention what I claim as new and desire to secure by Letters Patent, is:—

1. In a driving mechanism for bicycles, the combination with the pedal shaft, a drive shaft and a frame in which said shafts are mounted, of a bevel gear fixed on said pedal shaft, a pinion normally meshing therewith, an angularly disposed shaft on which said bevel pinion is mounted, a second bevel pinion on the outer end of said shaft, a train of gears adapted to be driven by said second pinion whereby said drive shaft may be actuated, and means for oscillating said angularly disposed shaft whereby said pinions are disengaged.

2. In a chainless drive for bicycles, the combination with a frame having an obliquely disposed post, a driving wheel and a pair of pedals, of a shaft on which said pedals are mounted, a driving gear rigid on said shaft, a shaft normally parallel with said post, a gear train carried by said post connections between said gear train and said driving wheel, pinions on each end of said second named shaft, one of said pinions being normally engaged with said driving gear and the other with said gear train, and means for oscillating said shaft so as to cause engagement or disengagement between said pinions and gears.

In testimony whereof I have affixed my signature.

MICHEAL WAKULENKO.

Copies of this patent may be obtained for five cents each, by addressing the "Commissioner of Patents, Washington, D. C."